United States Patent
Das et al.

(10) Patent No.: US 6,317,448 B1
(45) Date of Patent: Nov. 13, 2001

(54) BANDWIDTH ESTIMATING TECHNIQUE FOR NARROW BAND LASER

(75) Inventors: Palash P. Das, Vista; Jesse D. Buck, San Marcos, both of CA (US)

(73) Assignee: Cymer, Inc., San Diego, CA (US)

( * ) Notice: Subject to any disclaimer, the term of this patent is extended or adjusted under 35 U.S.C. 154(b) by 0 days.

(21) Appl. No.: 09/405,615

(22) Filed: Sep. 23, 1999

(51) Int. Cl.[7] ............................. H01S 3/10; H01S 3/13; H01S 3/22; H01S 3/223; G01N 21/00
(52) U.S. Cl. ........................ 372/60; 372/20; 372/32; 372/57; 356/432
(58) Field of Search ..................... 372/20, 32, 57, 372/60; 356/432, 437

(56) References Cited

U.S. PATENT DOCUMENTS

| | | | |
|---|---|---|---|
| 5,025,445 | 6/1991 | Anderson et al. | 372/20 |
| 5,450,207 | 9/1995 | Fomenkov | 356/416 |
| 5,978,394 | * 11/1999 | Newman et al. | 372/32 |
| 5,991,324 | * 11/1999 | Knowles et al. | 372/57 |

* cited by examiner

Primary Examiner—Frank G. Font
Assistant Examiner—Armando Rodriguez
(74) Attorney, Agent, or Firm—John R. Ross, Esq.

(57) ABSTRACT

A wavelength system for measuring the bandwidth of a narrowband laser utilizing prior art equipment normally provided for calibrating wavelength measurement equipment. The prior art includes a wavemeter for measuring incremental changes in wavelength and an atomic wavelength reference for calibrating the wavemeter. The atomic wavelength reference includes a vapor cell for providing a vapor having at least one absorption line near a desired operating wavelength. The system includes a wavelength tuning device with a tuning range sufficient to tune the laser to operate at the wavelength of the absorption line in order to calibrate the wavemeter. Measurements of the bandwidth of the absorption spectrum obtained by scanning the laser output wavelength over the absorption line are used to estimate the bandwidth of the output beam. This estimate in a preferred embodiment is used to confirm the accuracy of the normal bandwith measurements. In a preferred system the laser is a KrF laser and the vapor is iron vapor. In another preferred embodiment, the laser is an ArF laser, the vapor is platinum and the absorption line is either 193,224.3 pm or 193,436.9.

8 Claims, 14 Drawing Sheets

BANDWIDTH ESTIMATING TECHNIQUE FOR NARROW BAND LASER

FIELD OF THE INVENTION

This invention relates to lasers and in particular to techniques for measuring wavelength and bandwidth of narrow band lasers.

BACKGROUND

Various methods are well known for wavelength tuning of lasers. Typically the tuning takes place in a device referred to as a line narrowing package or line narrowing module. A typical technique used for line narrowing and tuning of excimer lasers is to provide a window at the back of the discharge cavity through which a portion of the laser beam passes into the line narrowing package. There, the portion of the beam is expanded and directed to a grating which reflects a narrow selected portion of the laser's broader spectrum back into the discharge chamber where it is amplified. The laser is typically tuned by changing the angle at which the beam illuminates the grating. This may be done by adjusting the position of the grating or providing a mirror adjustment in the beam path. The adjustment of the grating position or the mirror position may be made by a mechanism which we will refer to as a wavelength adjustment mechanism. For many applications it is important that the laser not only be finely tunable but also that the wavelength of the beam be set to a precise absolute value, with a very small deviation, such as for example 193.3500 nm±0.0001 nm. This requires very precise calibration of the wavelength adjustment mechanism. Wavelength measurements are typically made using gratings and/or etalons which disperse a laser beam spectrally to produce a spatial intensity distribution which is a function of wavelength. These devices are typically able to determine only changes in wavelength; therefore, in order for these devices to be used to measure absolute wavelengths they must be calibrated using a known reference wavelength.

U.S. Pat. No. 5,450,207, entitled "Method and Apparatus for Calibrating a Laser Wavelength Control Mechanism," by Igor Fomenkov, assigned to the present assignee and incorporated herein by reference, describes a method for calibrating a wavelength adjustment mechanism for a KrF excimer laser. In the '207 patent, a small portion of the light emitted by a laser is passed through a cell containing FeNe vapor, used as an absorption gas. The light exiting this vapor is then detected by a photodetector, and the intensity of the detected light is then analyzed. The FeNe vapor absorbs a portion of the laser light at a wavelength of 248.3271 nm. The laser has a tunable range between 247.9 nm to 248.7 nm. The wavelength of the beam can be tuned anywhere in the range by pivoting a tuning mirror. One or more dips in the intensity of the laser light passing through the vapor as the mirror is slewed through a range of angles are detected and used to calibrate the laser wavelength measuring system (hereinafter called wavemeter) so that the wavemeter will indicate a wavelength of 248.3271 nn when the laser is tuned to the above FeNe absorption peak of 248.3271. The wavemeter, once calibrated, may then accurately measure the absolute wavelength of laser light at other wavelengths. Such a wavemeter is described in U.S. Pat. No. 5,025,445, assigned to the present assignee and incorporated herein by reference. The calibration unit is called the atomic wavelength reference unit or simply "AWR".

The National Institute of Standards and Technology has published emission lines of platinum at 193,224.33 pm and 193,436.9 pm.

If the laser is used in a stepper in a wafer fabrication system, the stepper optics and the fabrication process are optimized for a specific laser wavelength. Accordingly, it is important that the laser wavelength be adjusted accurately so that a maximum amount of the laser energy occurs at the desired wavelength. It is also important that the bandwidth be kept very small, in the range of about 0.6 pm and that reliable methods of measuring it be available. Also, if the reliability of bandwidth measurements are questionable, a method is needed to confirm that the measurement is accurate or not.

What is needed are alternate techniques for estimating the bandwidth of narrow band excimer lasers.

SUMMARY OF THE INVENTION

The present invention provides a wavelength system for measuring the bandwidth of a narrowband laser utilizing prior art equipment normally provided for calibrating wavelength measurement equipment. The prior art includes a wavemeter for measuring incremental changes in wavelength and an atomic wavelength reference for calibrating the wavemeter. The atomic wavelength reference (AWR) includes a vapor cell for providing a vapor having at least one absorption line near a desired operating wavelength. The system includes a wavelength tuning device with a tuning range sufficient to tune the laser to operate at the wavelength of the absorption line in order to calibrate the wavemeter. Measurements of the bandwidth of the AWR absorption spectrum obtained by scanning the laser output wavelength over the absorption line are used to estimate the bandwidth of the output beam. This estimate in a preferred embodiment is used to confirm the accuracy of the normal bandwith measurements. In a preferred embodiment, the laser is a KrF laser and the vapor is iron vapor. In another preferred embodiment, the laser is an ArF laser, the vapor is platinum and the absorption line is either 193,224.3 pm or 193,436.9. Bandwidth estimates at FWHM and 95 percent integral may be made.

DETAILED DESCRIPTION OF PREFERRED EMBODIMENTS

ArF Natural Spectrum

Figure 1:
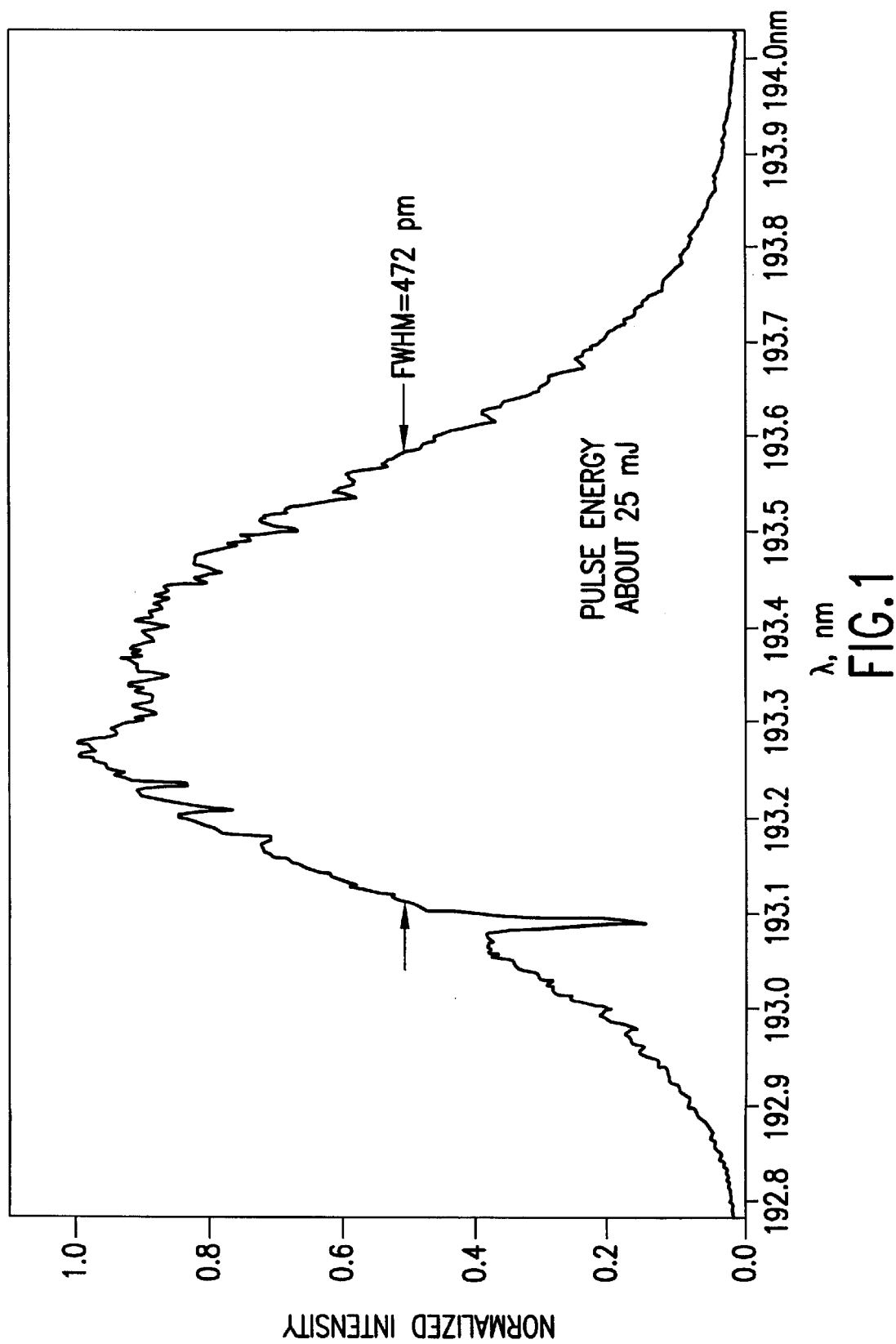
FIG. 1 is a graph of an ArF excimer laser broadband spectrum.

FIG. 1 shows the approximate natural broadband spectrum of a high pulse rate ArF excimer laser. As shown in FIG. 1, the FWHM bandwidth is about 472 pm. This particular laser may be operated at a rate of up to 1000 Hz, and the typical pulse energy is about 25 mJ per pulse. This broadband spectrum is generally not useful for integrated circuit lithography which typically requires bandwidths of less than 1.0 pm.

ArF Narrowband Spectrum

Figure 2:
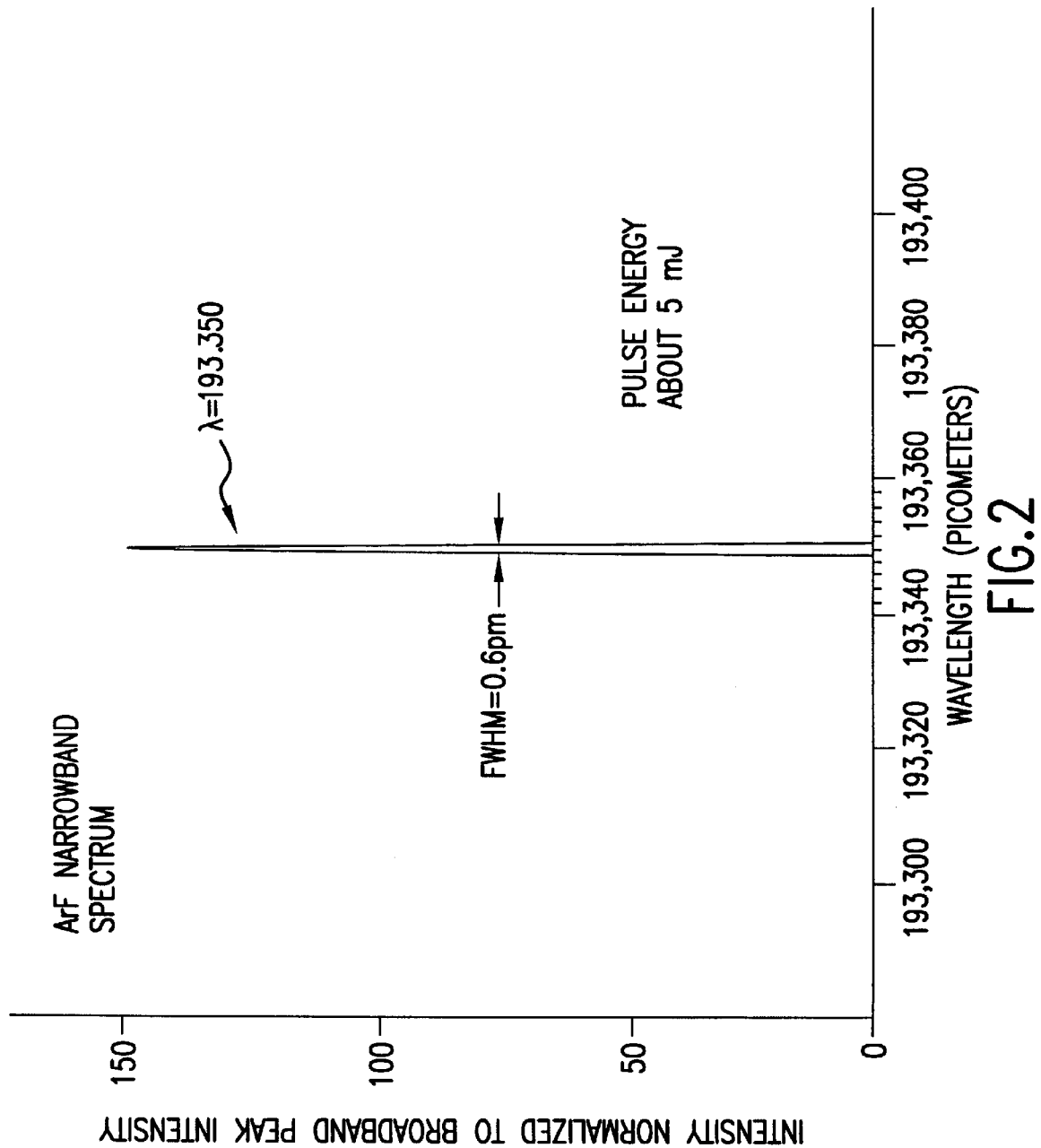
FIG. 2 is an ArF narrowband spectrum.

The laser may be narrow banded, using well known prior art techniques. Narrowbanding produces an output spectrum such as that shown in FIG. 2. In this case the FWHM bandwidth is greatly reduced (by a factor of almost 800) to about 0.6 pm, and the pulse energy is reduced (by a factor of about 5) to about 5 mJ. As a result, the intensity of the pulse at the desired narrow band is very greatly increased as indicated in FIG. 2.

Figure 3:
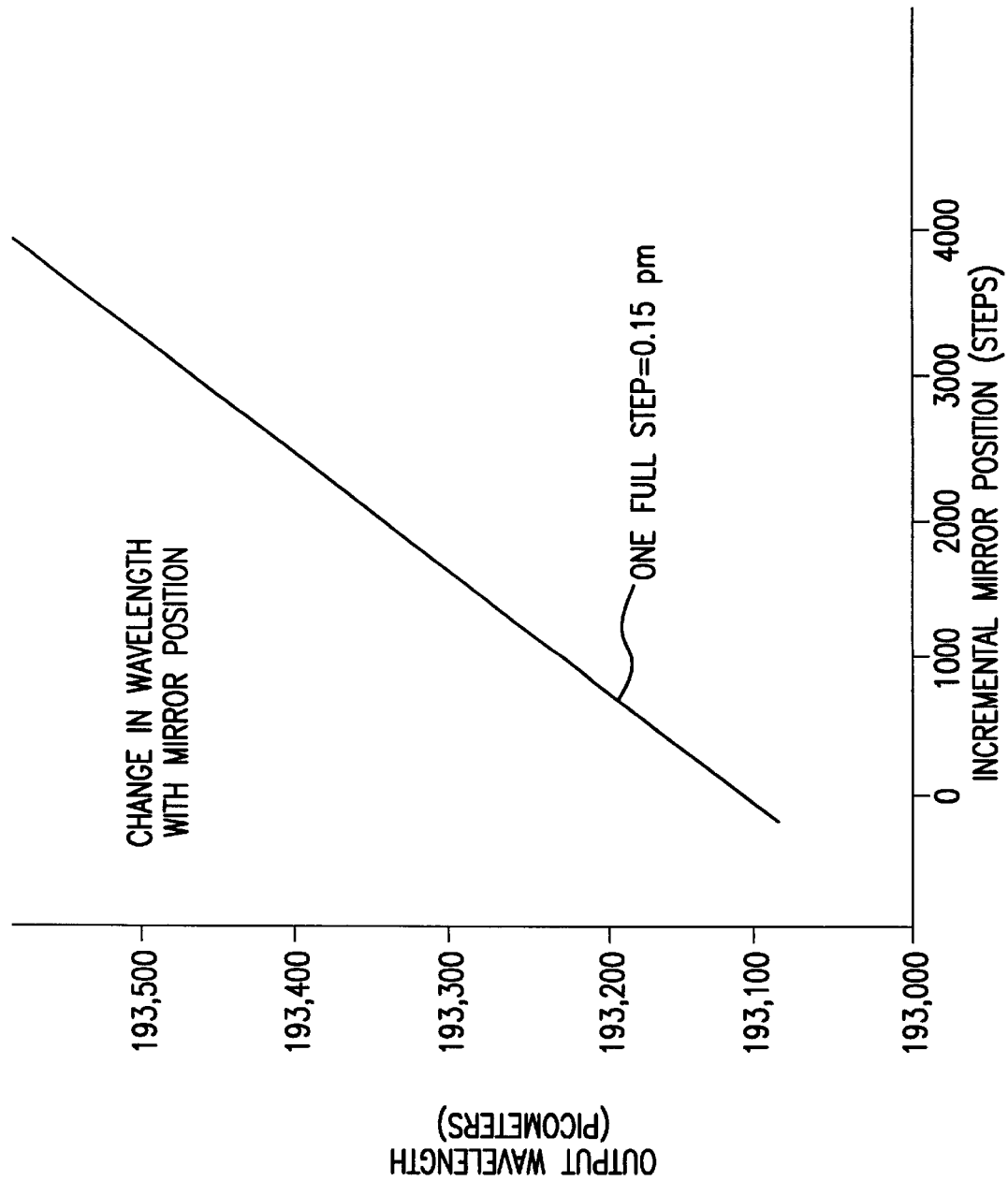
FIG. 3 shows the relationship between tuning mirror position and output wavelength for an ArF excimer laser.
Figure 4:
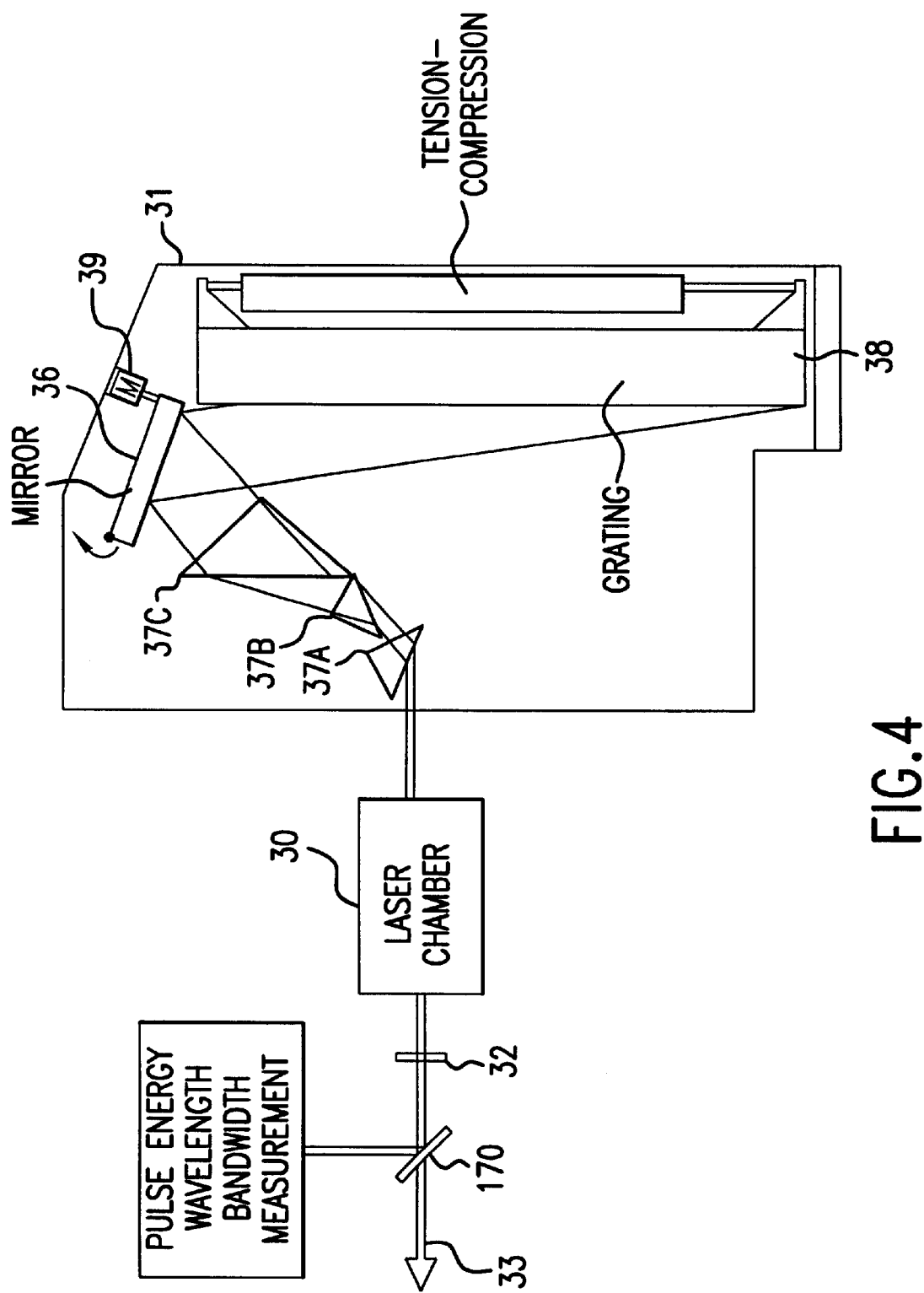
FIG. 4 is a block diagram showing the principal elements for controlling wavelength of an excimer laser.

As shown in FIG. 4, the laser 30 may be tuned to operate at any wavelength within the ArF broadband spectrum using tuning mirror 36 in line-narrowing module 31. In a preferred embodiment, the laser is tuned by pivoting mirror 36 with stepper motor 39 so as to slightly change the angle at which the laser beam (expanded by prisms 37A, 37B and 37C) is incident on grating 38. The relationship between wavelength and mirror position as measured by steps of stepper motor 39 is shown in FIG. 3 where one full step of the stepper motor produces a change of about 0.15 pm in the nominal narrowband output center wavelength. The stepper motor scan of a few millimeters is sufficient to scan the output wavelength of laser 30 throughout 500 pm tuning range from about 193,100 pm to about 193,600 pm. Note that the relationship between mirror position and wavelength is not exactly linear, but in the narrow tuning range of this laser, a linear relationship can be assumed and in this preferred embodiment linearity is not required.

Measuring Beam Parameters

Figure 10:
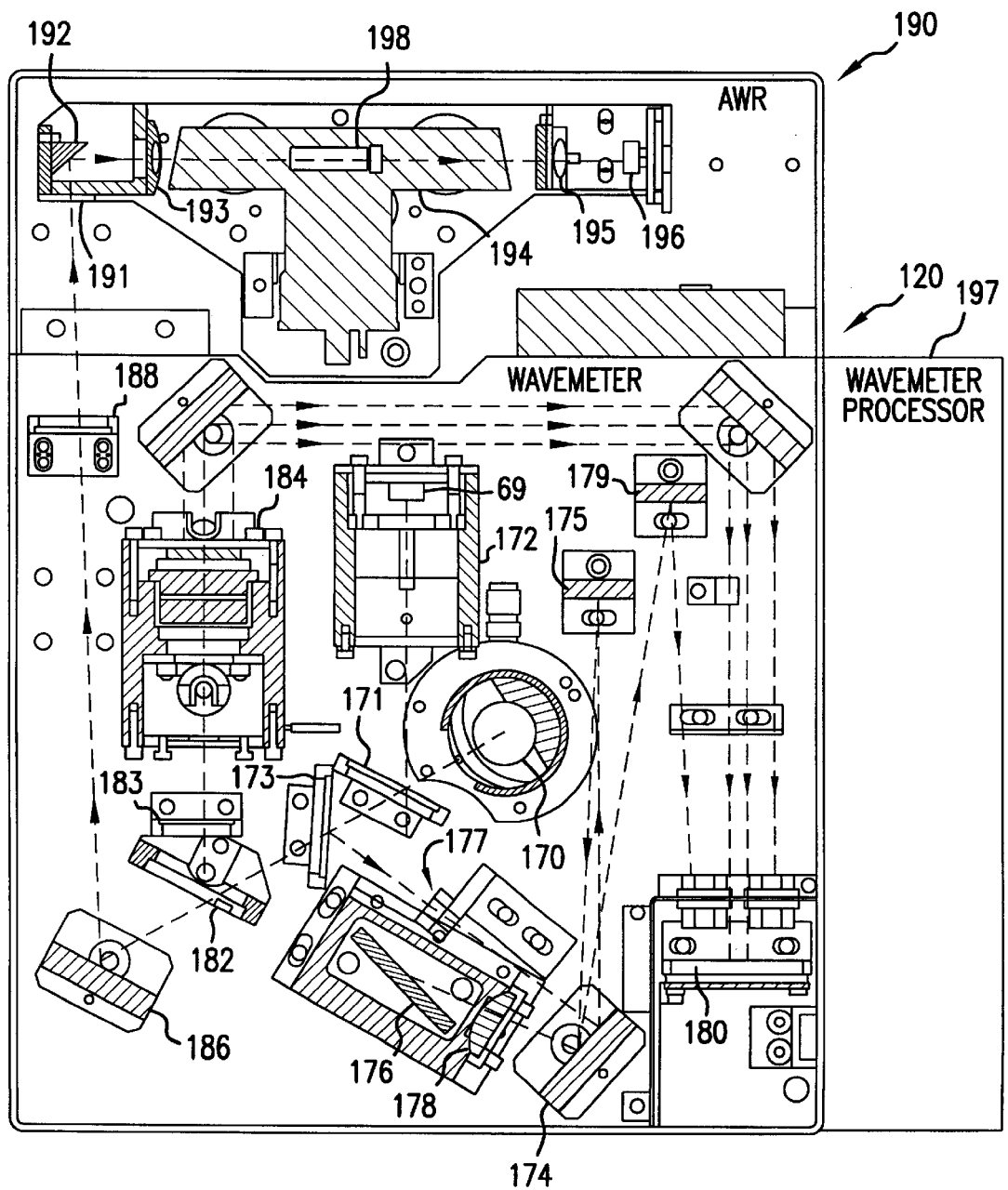
FIG. 10 shows a preferred layout of optical equipment for measuring wavelength of an ArF laser.

FIG. 10 shows the layouts of a preferred wavemeter unit 120 an absolute wavelength reference calibration unit 190, and a wavemeter processor 197.

The optical equipment in these units measure pulse energy, wavelength and bandwidth. These measurements are used with feedback circuits to maintain pulse energy and wavelength within desired limits. The equipment calibrates itself by reference to an atomic reference source on the command from the laser system control processor.

As shown in FIG. 10, the output beam from output coupler 32 (as shown in FIG. 4) intersects partially reflecting mirror 170, which passes about 95.5% of the beam energy as output beam 33 and reflects about 4.5% for pulse energy, wavelength and bandwidth measurement.

Pulse Energy

About 4% of the reflected beam is reflected by mirror 171 to energy detector 172 which comprises a very fast photo diode 69 which is able to measure the energy of individual pulses occurring at the rate of 1000 per second. The pulse energy is about 5 mJ, and the output of detector 69 is fed to a computer controller which uses a special algorithm to adjust the laser charging voltage to precisely control the pulse energy of future pulses based on stored pulse energy data in order to limit the variation of the energy of individual pulses and the integrated energy of bursts of pulses.

Coarse Wavelength Measurement

About 4% of the beam which passes through mirror 171 is reflected by mirror 173 through slit 177 to mirror 174, to mirror 175, back to mirror 174 and onto echelle grating 176. The beam is collimated by lens 178 having a focal length of 458.4 mm. Light reflected from grating 176 passes back through lens 178, is reflected again from mirrors 174, 175 and 174 again, and then is reflected from mirror 179 and focused onto the left side of 1024-pixel linear photo diode array 180. The spatial position of the beam on the photo diode array is a coarse measure of the relative nominal wavelength of the output beam.

Linear Photo Diode Array

Figure 5:
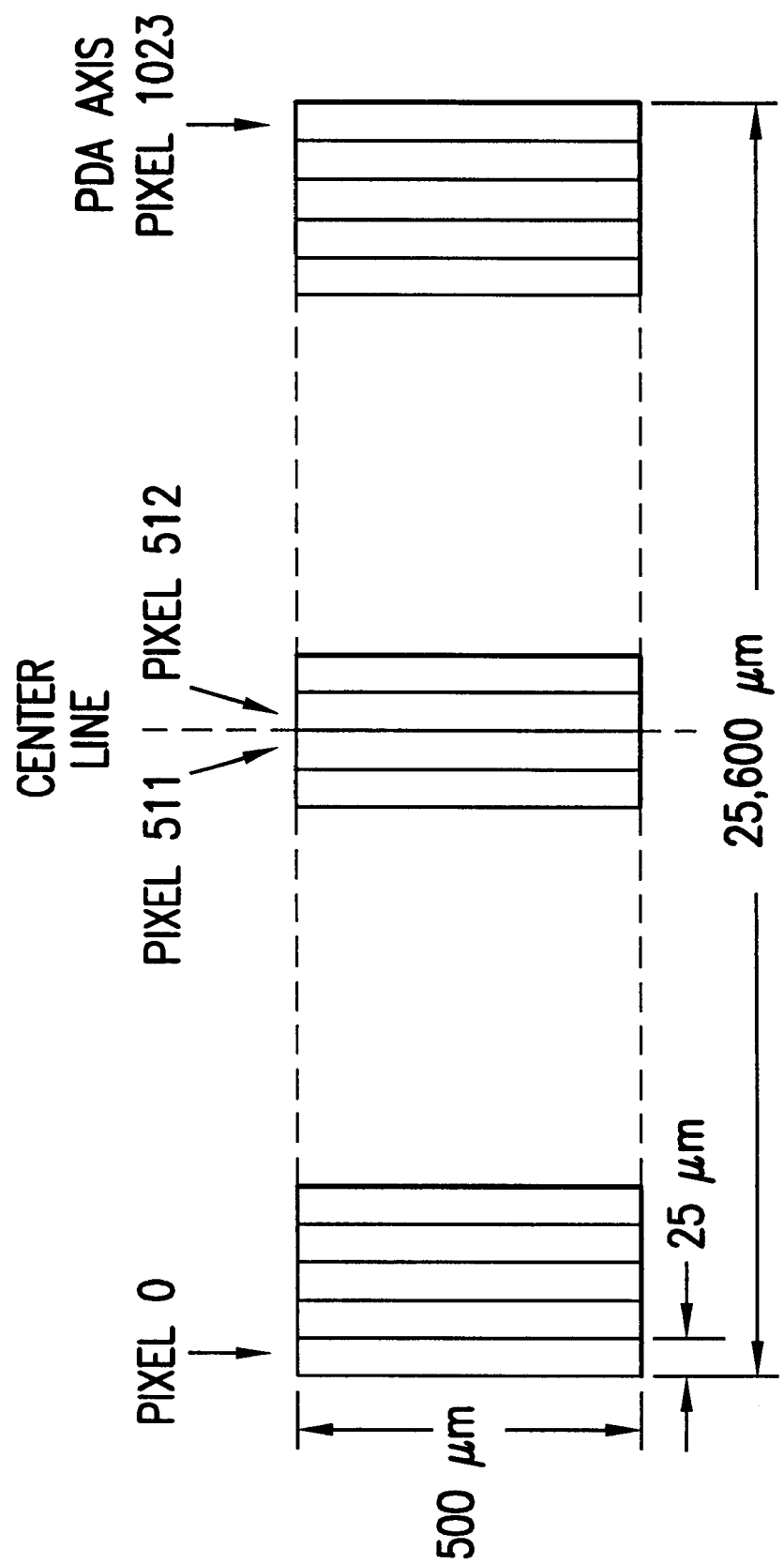
FIG. 5 depicts a 1024-pixel photo diode array.

Linear Photo diode array 180 is depicted in greater detail in FIG. 5. The array is an integrated circuit chip comprising 1024 separate photo diode integrated circuits and an associated sample and hold readout circuit. The photo diodes are on a 25 micrometer pitch for a total length of 25.6 mm (about one inch). Each photo diode is 500 micrometer long. Photo diode arrays such as this are available from several sources. A preferred supplier is Hamamatsu. In our preferred embodiment, we use a Model S3903-1024 which can be read at the rate of $2 \times 10^6$ pixels/sec on a FIFO basis in which complete 1024 pixel scans can be read at rates of 2000 Hz or greater.

Calculation of Coarse Wavelength

The coarse wavelength optics in wavemeter module 120 produces a rectangular image of about 0.25 mm×3 mm on the left side of photo diode array 180. The ten or eleven illuminated photo diodes will generate signals in proportion to the intensity of the illumination received and the signals are read and digitized by a processor in wavemeter controller 197. Using this information and an interpolation algorithm controller 197 calculates the center position of the image.

This position (measured in pixels) is converted into a coarse wavelength value using two calibration coefficients and assuming a linear relationship between position and wavelength. These calibration coefficients are determined by reference to an atomic wavelength reference source as described below. For example, the relationship between image position and wavelength might be the following algorithm:

$$\lambda = (2.3 \text{ pm/pixel})P + 191{,}625 \text{ pm}$$

where P=coarse image central positions

Fine Wavelength Measurement

About 95% of the beam which passes through mirror 173 as shown in FIG. 10 is reflected off mirror 182 through lens 183 onto a diffuser at the input to etalon assembly 184. The beam exiting etalon 184 is focused by a 458.4 mm focal length lens in the etalon assembly and produces interference fringes on the middle and right side of linear photo diode array 180 after being reflected off two mirrors as shown in FIG. 10.

The spectrometer must measure wavelength and bandwidth substantially in real time. Because the laser repetition rate may be 1000 $H_z$ or higher, it is necessary to use algorithms which are accurate but not computationally intensive in order to achieve the desired performance with economical and compact processing electronics. Calculational algorithm therefore preferably should use integer as opposed to floating point math, and mathematical operations should preferably be computation efficient (no use of square root, sine, log, etc.).

Figure 6:
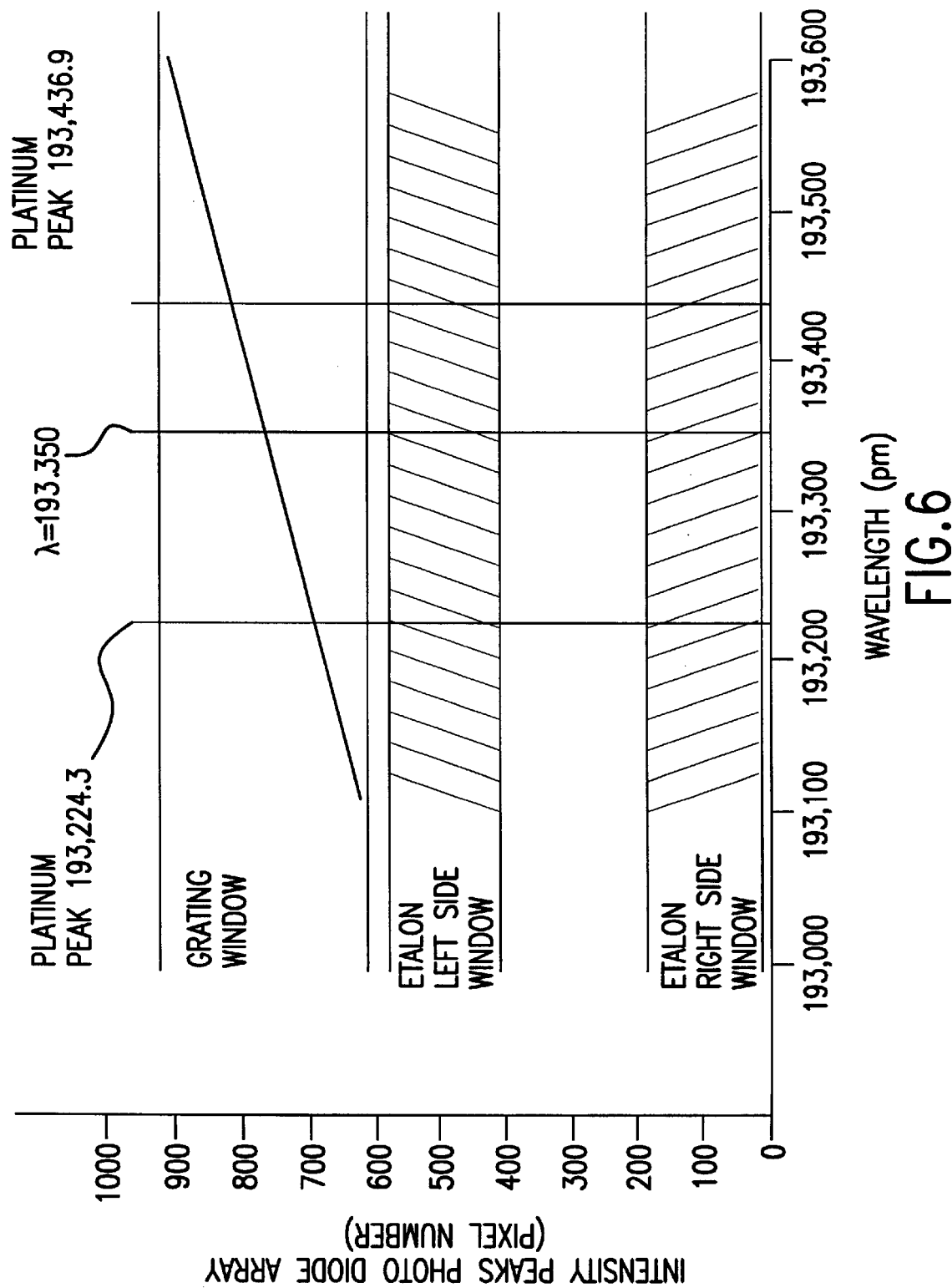
FIG. 6 describes the light patterns on the FIG. 5 photo diode array used for making coarse and fine wavelength measurements.
Figure 9A:
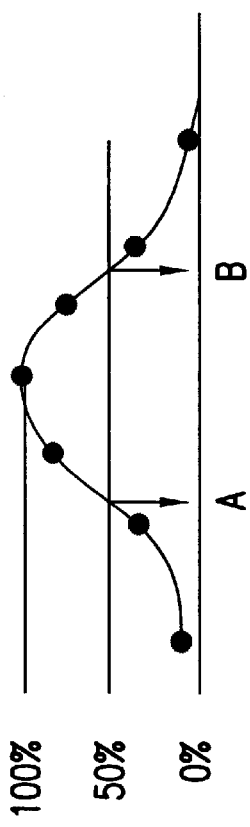
FIGS. 9A and 9B demonstrate how bandwidth and fringe diameters are measured using the output of the FIG. 5 photo diode.
Figure 9B:
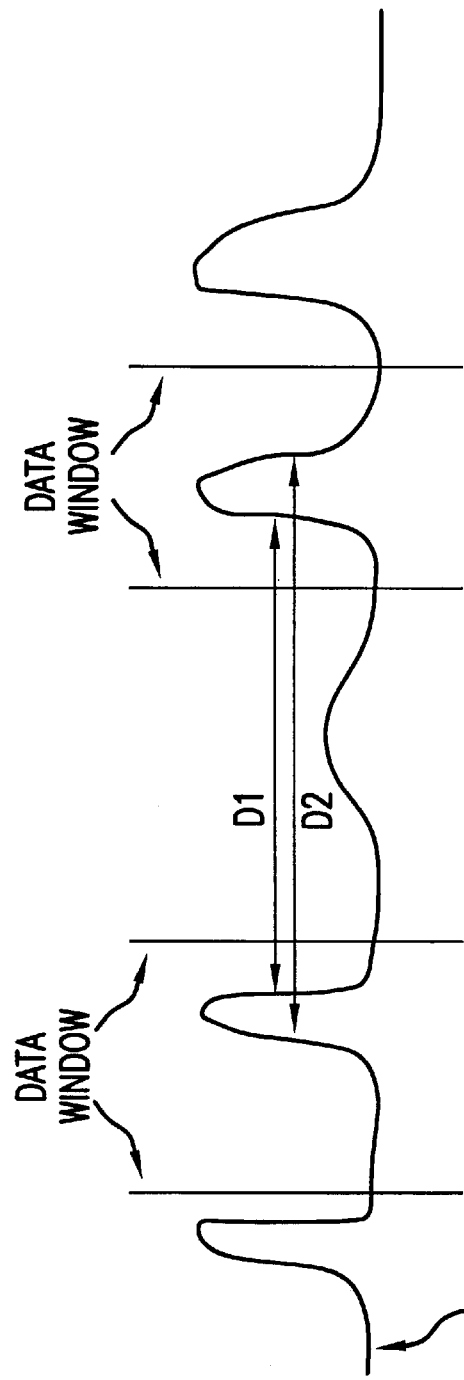

The specific details of a preferred algorithm used in this preferred embodiment will now be described. FIG. 9B is a curve with 5 peaks as shown which represents a typical etalon fringe signal as measured by linear photo diode array 180. The central peak is drawn lower in height than the others. As different wavelengths of light enter the etalon, the central peak will rise and fall, sometimes going to zero. This aspect renders the central peak unsuitable for the wavelength measurements. The other peaks will move toward or away from the central peak in response to changes in wavelength, so the position of these peaks can be used to determine the wavelength, while their width measures the bandwidth of the laser. Two regions, each labeled data window, are shown in FIG. 9B. The data windows are located so that the fringe nearest the central peak is normally used for the analysis. However, when the wavelength changes to move the fringe too close to the central peak (which will cause distortion and resulting errors), the first peak is outside the window, but the second closest peak will be inside the window, and the software causes the processor in control module 197 to use the second peak. Conversely, when the wavelength shifts to move the current peak outside the data window away from the central peak the software will jump to an inner fringe within the data window. The data windows are also depicted on FIG. 6.

The steps involved are as follows:

1. After a laser shot, the photo diode array output is electronically read out and digitized. Data points are separated by an interval physically determined by the spacing of the photo diode array elements, in this case 25 micrometer pitch.
2. The digital data is searched to find the peak intensity value in the data window. The previous peak location is used as a stating point. Small regions are searched left and right of the starting point. The search region is extended by small intervals left and right until a peak is found. If the peak is outside the data window, the search will automatically continue until the other peak is found.
3. Based on the intensity of the peak, a 50% level is computed as shown in FIG. 9A. The 0% level is measured periodically between the pulses. Based on the computed 50% level, points are examined right and left of the peak until the data points which border the 50% level are found. A linear interpolation is computed between pairs of points, which border the 50% level to find the leftand right half-maximum positions, labeled A, and B in FIG. 9A. These positions are computed to a fraction of a pixel such as 1/16, using an integer data format.
4. Steps 2 and 3 are duplicated for the two data windows, giving a total of four interpolated 50% positions. As indicated FIG. 9B, two diameters are computed. D1 is the inner fringe diameter while D2 is the outer fringe diameter.
5. An approximation to the wavelength is determined by the coarse wavelength circuit, as described in the preceding section "Coarse Wavelength Measurement."

Fine Wavelength Calculation

The inner and outer fringe diameters D1 and D2 (in units of pixels) are each converted to wavelength by the following equations:

$$\lambda = \lambda_0 + Cd(D^2 - D_0^2) + (N)(FSR)$$

where $\lambda$=wavelength corresponding to diameter D
$\lambda_0$=calibration wavelength
$D_0$=diameter corresponding to wavelength $\lambda_0$
Cd=calibration constant dependant on the optical design
FSR=free spectral range of the etalon
N=integer,=0, ±1, ±2, ±3 . . .

The values $\lambda_0$, $K_1$, FSR, and $D_0$ are determined and stored at the time of calibration. The value for N is chosen such that:

$$|\lambda - \lambda_c| \leq \tfrac{1}{2} FSR$$

where $\lambda_c$=coarse wavelength determination.

For example, in a preferred embodiment, we select a reference wavelength $\lambda_0$=193,436.9 pm (corresponding to an absorption line of a platinum hollow cathode lamp). At this wavelength, the fringe diameter $D_0$ might be found to be 300 pixels. Cd is a constant which can either be directly measured or calculated from the optical design. In our preferred embodiment, Cd=$-9.25 \times 10^{-5}$ pm/pixel$^2$. Thus, for example, with the laser operating at a different wavelength, the fringe diameter may be measured to be 405 pixels. The possible wavelengths computed by equation (1) are:

$$\lambda = 193{,}436.9\, pm - 9.25 \times 10^{-5}\, pm/pixel^2[(405)^2 - (300)^2] + N \cdot FSR$$

$$= 193{,}443.7 + (N)(FSR)$$

If the free spectral range FSR=20 pm, then the possible values for $\lambda$ include:

| | |
|---|---|
| 193,403.7 pm | N = −2 |
| 193,423.7 | N = −1 |
| 193,443.7 | N = 0 |
| 193,463.7 | N = +1 |
| 193,483.7 | N = +2 |

If the coarse wavelength is determined to be $\lambda_c$=193,401.9, for example, then the processor will select the value $\lambda$=193,403.7 pm (N=−2) as the solution in the closest agreement with $\lambda_c$.

The inner and outer fringe diameters $D_1$ and $D_2$ as shown in FIG. 9B are each converted into wavelengths $\lambda_1$ and $\lambda_2$, respectively. The final value which is reported for the laser wavelength is the average of these two calculations:

$$\lambda = \left(\frac{\lambda_1 + \lambda_2}{2}\right)$$

Bandwidth Calculation

The bandwidth of the laser is computed as $(\lambda_2-\lambda_1)/2$. A fixed correction factor is applied to account for the intrinsic width of the etalon peak adding to the true laser bandwidth. Mathematically, a deconvolution algorithm is the formalism for removing the etalon intrinsic width from the measured width, but this would be far too computation-intensive, so a fixed correction $\Delta\lambda\epsilon$ is subtracted, which provides sufficient accuracy. Therefore, the bandwidth is:

$$\Delta\lambda = \left(\frac{D_2 - D_1}{2}\right) - \Delta\lambda\epsilon$$

$\Delta\lambda\epsilon$ depends on both the etalon specifications and the true laser bandwidth. It typically lies in the range of 0.1–1 pm for the application described here.

Calibration with Atomic Reference Source

In this preferred embodiment, wavemeter 120 is calibrated with the optical equipment shown in atomic wave reference unit 190 as shown in FIG. 10.

Figure 12:
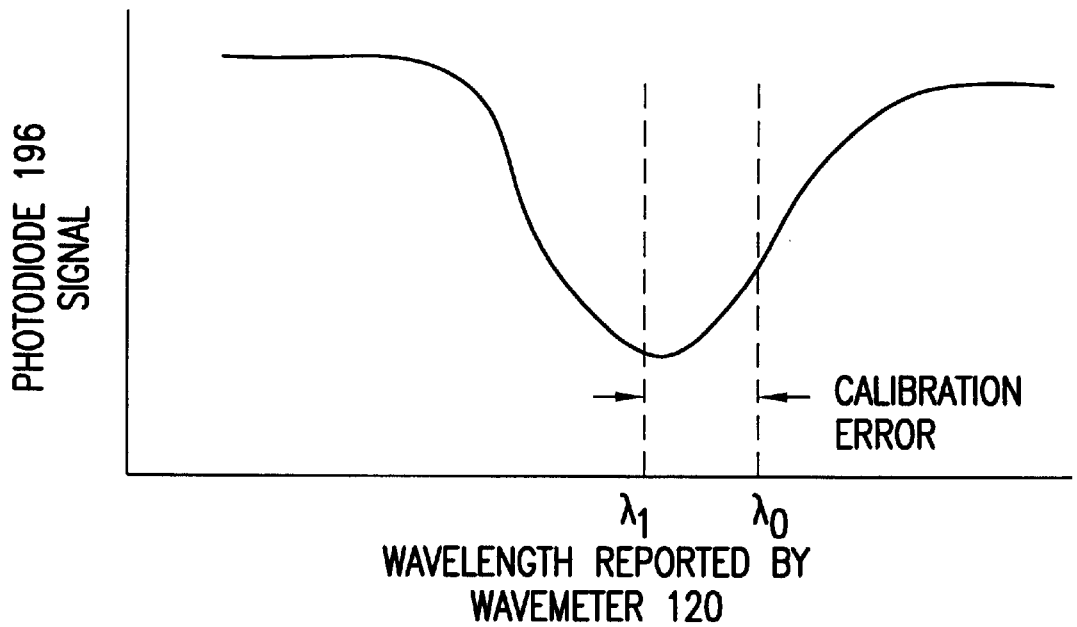
FIG. 12 is a graph showing absorption in the vapor cell.

The approximately 5% portion of the beam passing through mirror 182 is reflected from mirror 186 through lens 188 and into atomic wavelength reference unit 190. The light passes through diffuser 191, reflects off mirror 192 and is focused by lens 193 to a focal point in the center of vapor cell 194, and is focused again by lens 195 onto photo diode 196. Calibration is accomplished by scanning the wavelength of the laser (with tuning mirror 36 as shown in FIG. 4.) while keeping the output energy of the laser constant, as monitored and controlled by energy detector 69. In this preferred embodiment, the scanning and calibration sequence is automated and programmed into the control electronics for the laser. The wavelength range of the scan is chosen so as to include an absorption wavelength of the platinum vapor cell 194. For example, in this preferred embodiment, the strong absorption at 193,436.9 pm is used, and the laser is programmed to scan from about 193,434 pm to 193, 440 pm. When the laser wavelength coincides with the absorption wavelength, a substantial reduction in signal (10–50%) is seen by the photo diode 196. During the scan, two corresponding sets of data are taken, the signal from the photo diode 196, and the wavelength as measured by the wavemeter 120. A representative set of data is shown in FIG. 12, where the signal from the photo diode 196 is plotted against the wavelength as reported by the wavemeter 120. The processor analyzes the photo diode data and determines the apparent wavelength $\lambda_1$ which corresponds to the center of the absorption dip. Since the true wavelength $\lambda_0$ of the atomic absorption reference is known with precision, the calibration error $(\lambda_1-\lambda_0)$ can be calculated. This error is then used to automatically correct the calibration constants used by both the coarse and fine wavelength algorithms.

Improved Etalon

Conventional etalon mounting schemes typically employ an elastomer to mount the optical elements to the surrounding structure, to constrain the position of the elements but minimize forces applied to the elements. A compound commonly used for this is room-temperature vulcanizing silicone (RTV). However, various organic vapors emitted from these elastomers can deposit onto the optical surfaces, degrading their performance. In order to prolong etalon performance lifetime, it is desirable to mount the etalon in a sealed enclosure that does not contain any elastomer compounds.

Figure 7A:
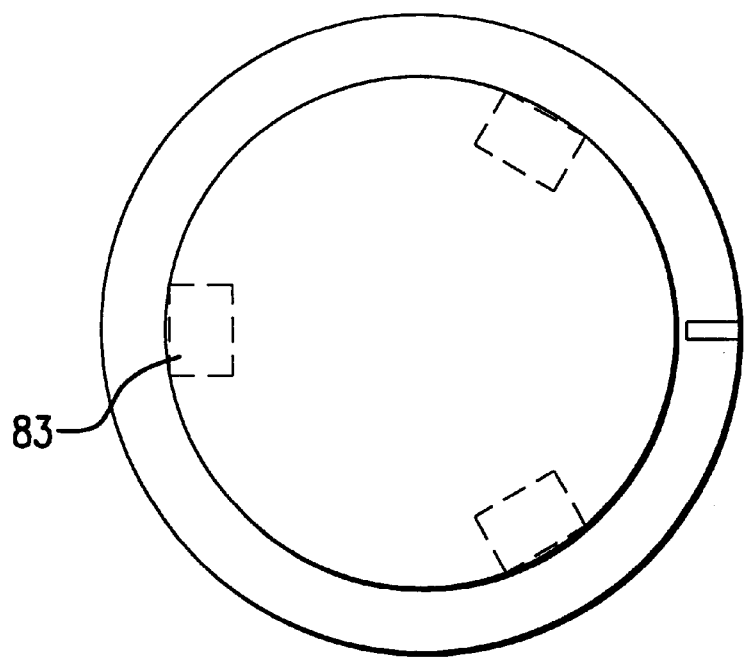
FIGS. 7A and 7B are views of an etalon.
Figure 7B:
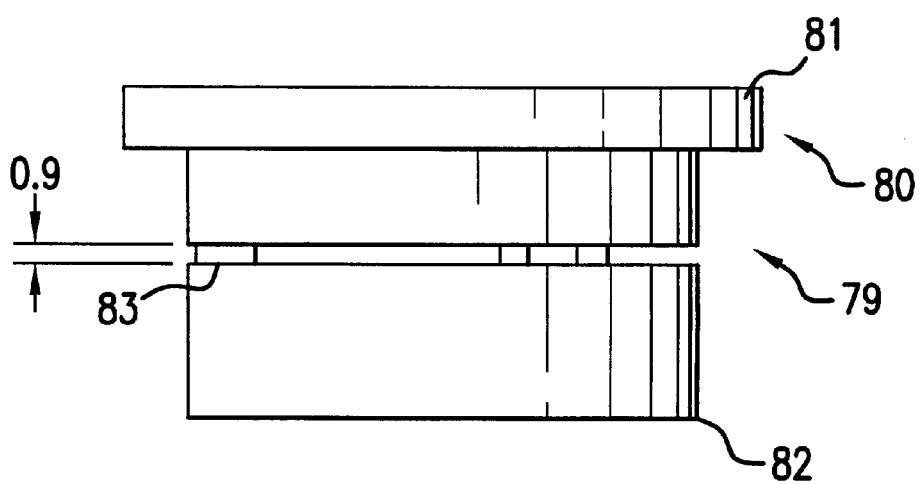
Figure 8:
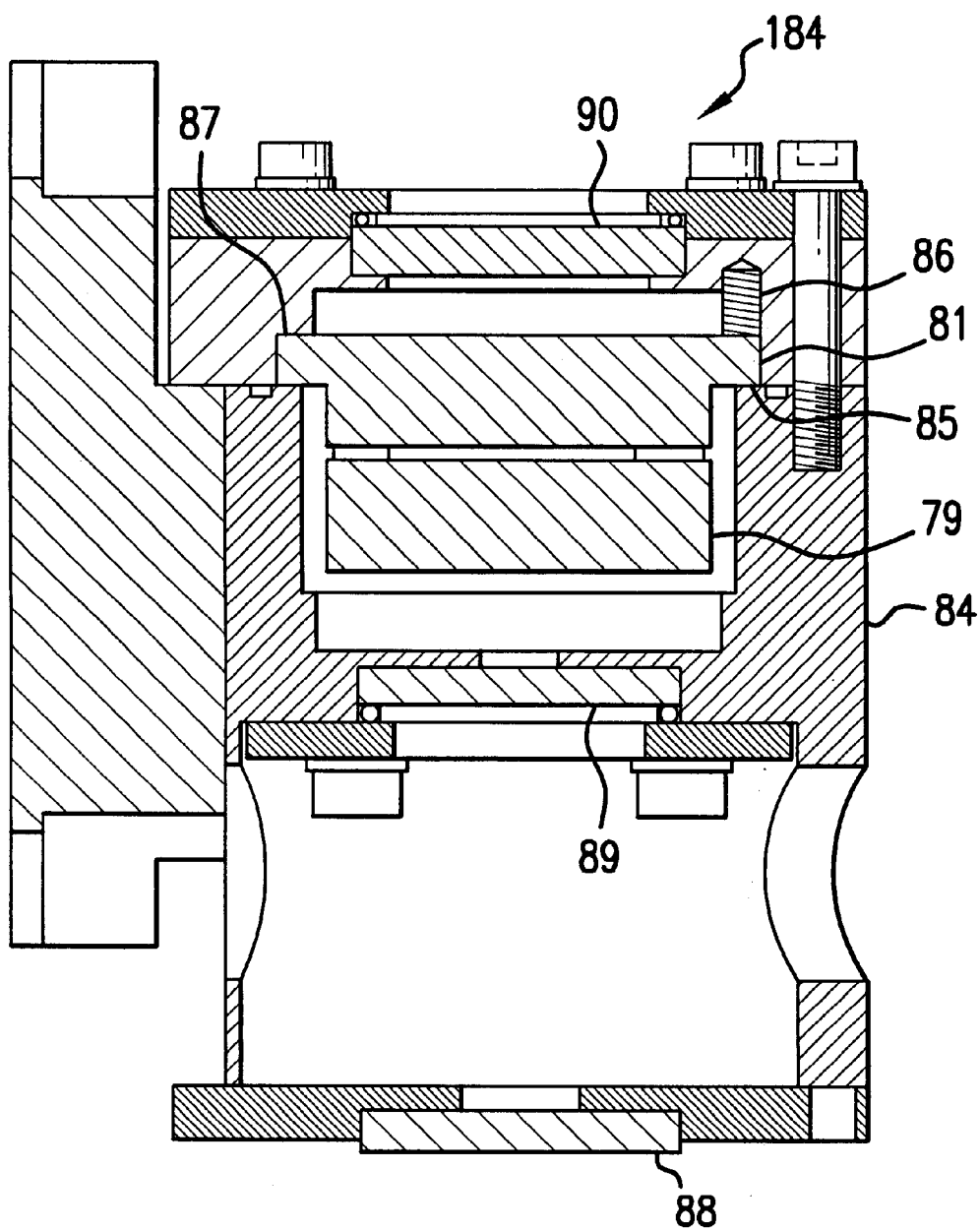
FIG. 8 is a drawing of an etalon assembly.

A preferred embodiment includes an improved etalon assembly shown at 184 in FIG. 10. In this etalon assembly is shown in detail in FIGS. 7A and 7B, the fused silica etalon 79 itself is comprised of a top plate 80 having a flange 81 and a lower plate 82, both plates being comprised of premium grade fused silica. The etalon is designed to produce fringes having free spectral range of 20.00 pm at 193.35 nm when surrounded by gas with an index of refraction of 1.0003 and a finesse equal to or greater than 25. Three fused silica spacers 83 with ultra low thermal expansion separate the plates and are 934 micrometer ±1 micrometer thick. These hold the etalon together by optical contact using a technique well known in the optics manufacturing art. The reflectance of the inside surfaces of the etalon are each about 88 percent and the outside surfaces are anti-reflection coated. The transmission of the etalon is about 50 percent.

The etalon 79 is held in place in aluminum housing 84 only by gravity and three low force springs 86 pressing the flange against three pads not shown but positioned on 120 degree centers under the bottom edge of flange 81 at the radial location indicated by leader 85. A clearance of only 0.004 inch along the top edge of flange 81 at 87 assures that the eon will remain approximately in its proper position. This close tolerance fit also ensures that if any shock or impulse is transferred to the etalon system through the mounting, the relative velocities between the optical components and the housing contact points will be kept to a minimum. Other optical components of etalon assembly 184 include diffuser 88, window 89 and focusing lens 90 having a focal length of 458.4 mm.

The diffuser 88 may be a standard prior art diffuser commonly used up-stream of an etalon to produce a great variety of incident angles needed for the proper operation of the etalon. A problem with prior art diffusers is that about 90 percent of the light passing through the diffuser is not at a useful angle and consequently is not focused on the photo diode array. This wasted light, however, adds to the heating of the optical system and can contribute to degradation of optical surfaces. In an alternative embodiment a diffractive lens array is used as the diffuser 88. In this case a pattern is produced in the diffractive lens array which scatters the light thoroughly but only within an angle of about 5 degrees. The result is that about 90 percent of the light falling on the etalon is incident at useful angles and a much greater portion of the light incident on the etalon is ultimately detected by the photo diode array. The result is the light incident on the etalon can be greatly reduced which greatly increases optical component life. Applicants estimate that the incident light can be reduced to less than 10% of prior art values with equivalent light on the photo diode array.

Platinum Vapor Cell

Details of platinum vapor cell 194 are described by reference to FIG. 11. This cell is a modified series L2783 hollow cathode lamp tube similar to the one described in U.S. Pat. No. 5,450,202. A glass envelope with UV-transmitting windows 314 and 316 contains neutral gas, neon. The major difference is that the hollow cathode of the cell in this preferred embodiment comprises a very thin platinum "hollow T" shaped sleeve which covers the surface of the cathode 320 facing anode 318 and the inside surface of hollow cathode 320.

Figure 11:
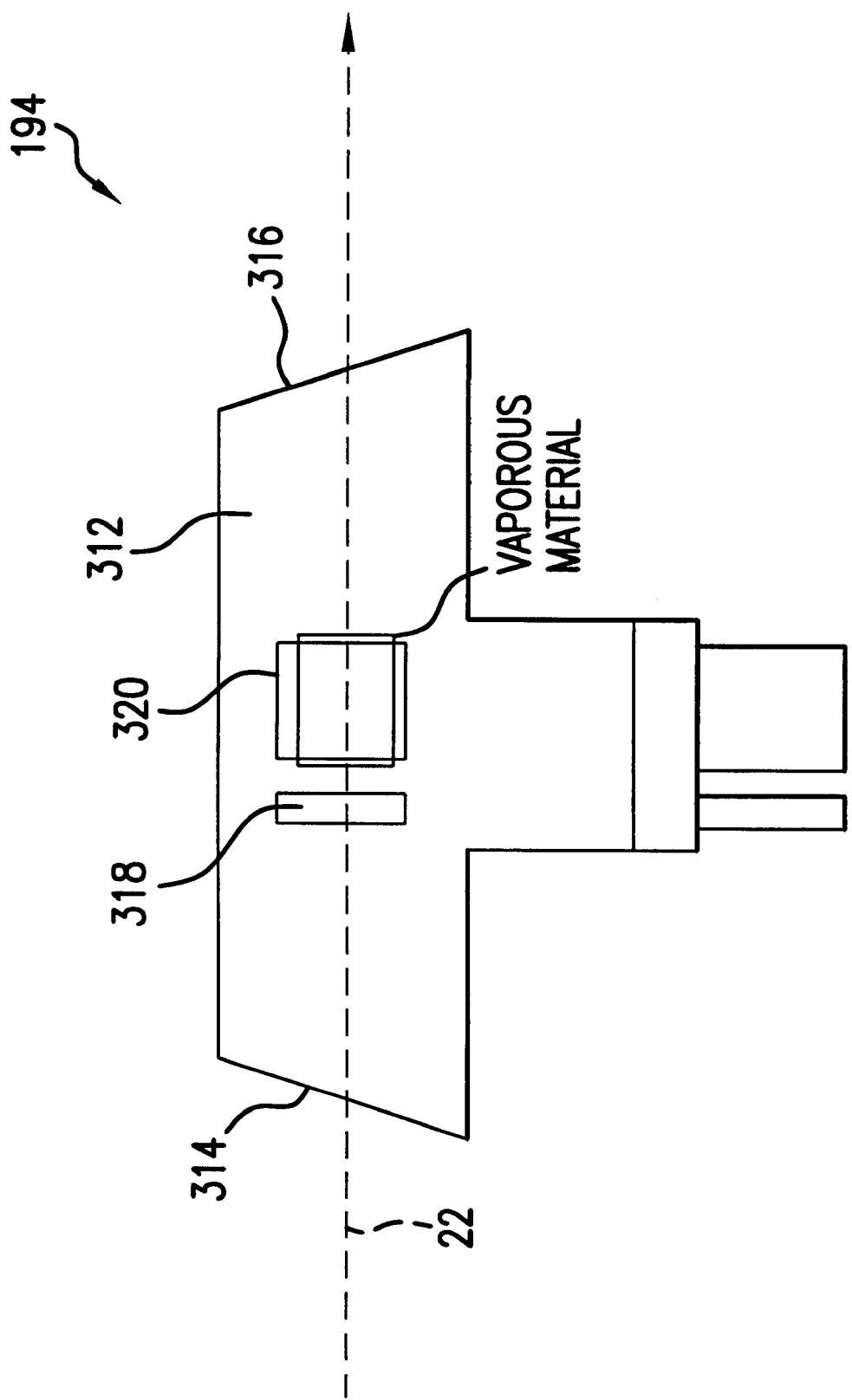
FIG. 11 is a drawing of a vapor cell.

A DC source of about 150 volts energizes the cell creating a plasma containing platinum ions which are generally contained within the hollow cathode as a vaporous material as shown in FIG. 11.

Other Preferred Embodiments

In another preferred embodiment of the system, the laser 30 at FIG. 4 contains fluorine gas ($F_2$) and is tunable through a range of wavelengths that includes 157.639 nm, and the absorption cell 194 contains a vapor including bromine atoms. The cell 194 may consist of a hollow cathode lamp as described above but with a cathode containing bromine. Alternatively, other sealed containers with windows arranged for transmitting the beam to detector 196 could be used.

In another preferred embodiment of this invention, focusing element 193 may be used with a suitable aperture to allow a collimated portion of the beam to pass through the cathode 198, through optical element 195 and onto detector 196. In this embodiment, measures must be taken to avoid optical interference effects due to reflections from parallel surfaces of the windows in cell 194. Such measures might include providing a small wedge angle between the inner and outer window surfaces on both the entrance and exit windows of cell 194.

Since the platinum vapor provides two distinctive absorption lines within the tuning range of the ArF laser, both lines are available if needed to improve the accuracy of the calibration. Procedures could be established to use both lines on each calibration. But preferably the second line could be checked only occasionally if the occasional checks show the calibration at one line calibrates the laser accurately at the second line.

Other Techniques for Tuning the Laser

Tuning of laser 30 of FIG. 4 to a desired wavelength may be performed in various well known ways, which may be mechanically, optically, or chemically (by controlling the gas components within laser 30), although tuning the laser optically, as shown in FIG. 4, is preferred. Any of these known mechanisms for tuning a laser in response to a control signal may constitute the wavelength adjustment mechanism.

Although a specific structure is shown for detecting platinum absorption lines other suitable embodiments may be employed. These may be implemented using different optical setups, as would be understood by those skilled in the art after reviewing this disclosure.

Estimating Bandwidth from AWR Measurements

The optical equipment described above and the associated software is relatively sophisticated and complicated and is not easily understood by many of the operators of these laser systems. Sometimes the equipment will not operate properly and sometimes a bug will appear in the software. Also, even if the system is operating perfectly, the operator may not be confident that fact. The following procedure permits data taken in connection with wavelength calibration to be used to check the accuracy of the wavemeter. The FWHM, or Full-Width of Half Maximum is the wavelength difference between the right and left sides of the peak which are at 50% of the intensity level of the peak. The 95% integral bandwidth is accepted as being a more relevant measure of beam quality for lithography applications than FWHM. To compute $\Delta\lambda_{95\% \ INT}$ the integral of the spectrum is computed, and then normalized so that it ranges from 0 to 1. Then the $\Delta\lambda_{(95\% \ INT)}$ is the wavelength difference between the point at which the integral is 0.025 and the point at which the integral is 0.975. This wavelength range of $\Delta\lambda_{(95\% \ INT)}$ thus contains 95% of the energy of the laser, with the remaining 5% distributed equally as 2.5% in both higher and lower wavelengths. Both FWHM bandwidths and 95% integral bandwidth can be estimated for both ArF and KrF lasers having AWR units. Typical procedures are explained below.

Estimating Full Width Half Maximum Bandwidth (Assuming Gaussian Spectra)

ArF Laser

Figure 13:
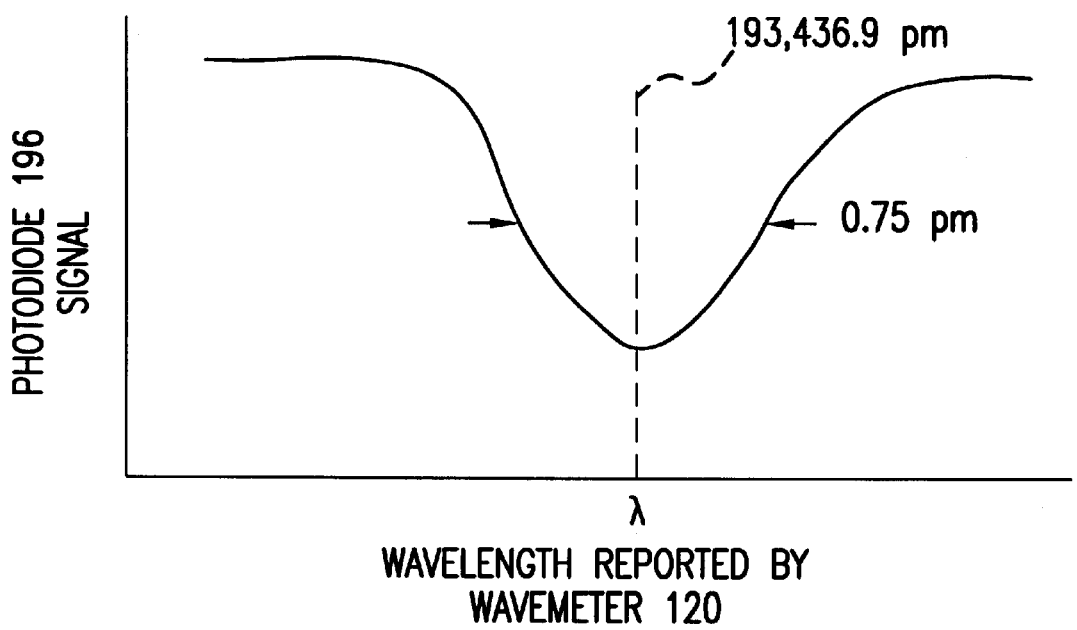
FIG. 13 is a graph showing the use of an absorption cell curve to estimate an AWR bandwidth.

The laser operator should complete a calibration and an adjustment as described above in the section entitled "Calibration with Atomic Reference Source" so that $\lambda_1 - \lambda_0$ as shown in FIG. 12 is zero. Then he should scan the laser wavelength over the platinum absorption line and plot the resulting photodiode 196 signal to obtain a curve similar to the one shown in FIG. 12. Such a plot is shown in FIG. 13. Measure the FWHM bandwidth of the plotted curve. The example in FIG. 13 indicates a FWHM bandwidth of 0.75 pm. The FWHM bandwidth of this curve is a convolution of the laser bandwidth and the bandwidth of the platinum line. Making the assumption that both the true laser spectrum and the AWR laser spectrum were both Gaussian, the FWHM bandwidths are approximately related by the following formula:

$$\Delta\lambda_{AWR} = (\Delta\lambda^2_{LASER} + \Delta\lambda^2_{Pl})^{1/2}$$

The FWHM platinum line width is about 0.45 pm. Therefore the $\Delta\lambda$ can be estimated by:

$$\Delta\lambda_{LASER} = (\Delta\lambda^2_{AWR} - 0.2025 \ pm^2)^{1/2}$$

Using the FIG. 13 example where $\Delta\lambda_{AWR}=0.75$, $$\Delta\lambda_{LASER} = (0.5625 \ pm^2 - 0.2025 \ pm^2)^{1/2}$$

$$= 0.6 \ pm$$

KrF Laser

The same type of procedures can be used to check the bandwidth measurements of a KrF laser. Prior art wavemeter equipment and calibration optics are described in U.S. Pat. Nos. 5,025,445 and 5,450,207. For the KrF laser an iron vapor absorption line is used having a bandwidth of about 0.8 pm. Therefore, a preferred formula for estimating laser bandwidth is:

$$\Delta\lambda_{LASER} = (\Delta\lambda^2_{AWR} - \Delta\lambda^2_{Ir})^{1/2}$$

$$= (\Delta\lambda^2_{AWR} - 0.64 \ pm^2)^{1/2}$$

Figure 14:
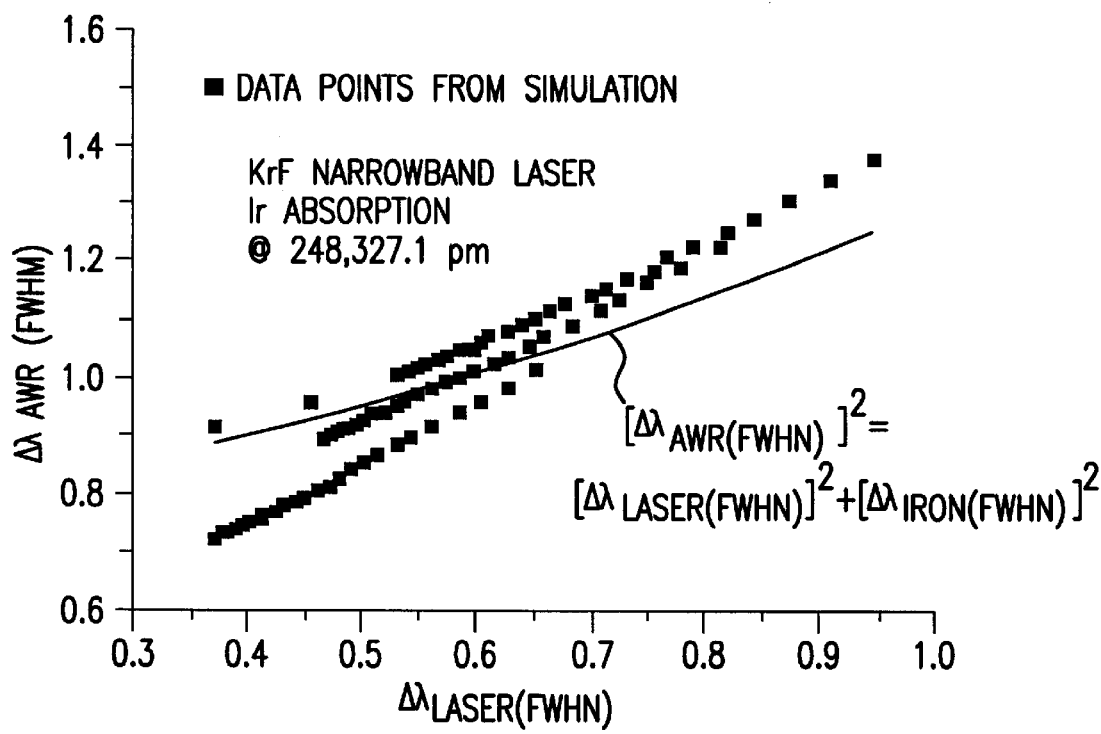
FIGS. 14–16 are graphs demonstrating aspects of the present invention.

Applicants have developed a computer model to simulate these bandwidth measurements. Simulation runs are plotted in FIG. 14 for three typical laser operating parameters. A curve representing the above equation is superimposed over the plotted data. The reader should note that it is possible to provide a different equation (such as a quadratic equation as discussed below) which would produce a better fit to the simulation data, but the above equation is believed to fit the data within statistical variations.

Estimating 95 Percent Integral Bandwidth

Beer's Law—Correlation Equations

Figure 16:
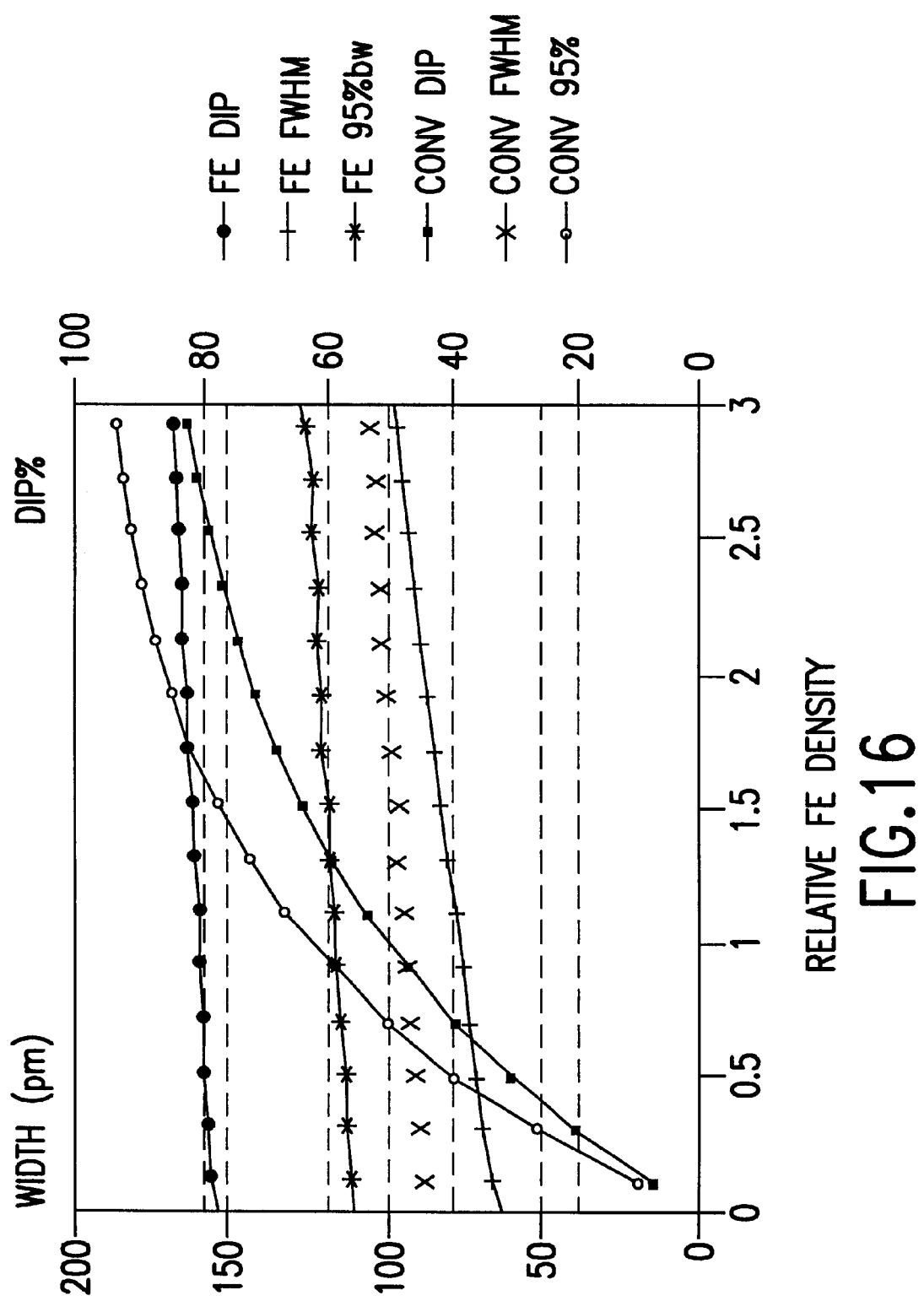

Due to Beer's law, the profile of the Fe lamp dip is not exactly a Gaussian curve. The cross section of the Fe lamp is Gaussian, assuming that Doppler broadening is the sole contributor to the width. The absorption profile is determined from the cross section by Beer's law:

$$I/Io = \exp(-sigma*No)$$

Where sigma is the Fe absorption cross section and No is the density of iron atoms. The absorption spectrum thus depends on the density of iron atoms. Therefore, the absorption spectrum is Gaussian for low values of absorption and becomes more non-Gaussian as absorption increases. Therefore, we have considered non-Gaussian correlations to estimate the true laser bandwidth values from the measured AWR bandwidth values. FIG. 16 is a plot of six parameters as a function of Fe density assuming a 0.66 pm FWHM for the Fe cross section and 0.51 pm FWHM and 1.10 pm (95% integral) for the laser spectrum. The data points labeled Fe dip, Fe FWHM, and Fe 95% refer to the values that would be measured with an infinitely narrow light source. The convolved data points specify what is found using the laser spectrum convolved with the Fe absorption spectrum. The Fe FWHM value increases as the Fe density increases. Since we know that the Fe absorbance has nearly a 0.80 FWHM at 60% dip, a value of 0.66 pm FWHM for the cross section appears to be a good estimate.

Figure 15:
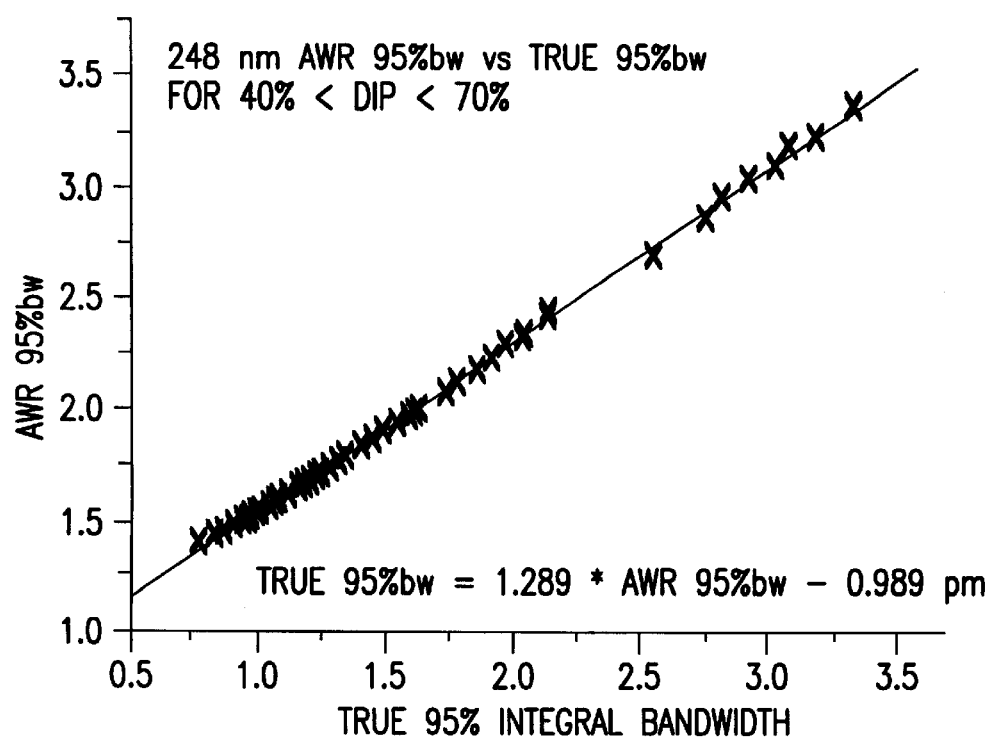

A number of simulation runs were performed with the laser spectrum and the relative Fe density values of 40%, 50%, 60% and 70% and in FIG. 15 the relation between true 95% bw and AWR 95% bw is plotted. The 95% bw measured for the laser (the convolved data points) increases somewhat as the absorption increases. However, the change as the dip ranges between 40% and 70% is only a few hundredths of a pm and the four values of AWR 95% width for each value of laser 95% bandwidth appear almost as a single point. The points are adequately fit by a straight line. This line is:

True 95% bw=(1.289)95% bw−0.986

A slightly better correlation can be obtained by using a quadratic fit and accounting for the parametric dependence on the percent dip, but since the linear fit has a standard deviation of 0.025 pm, this effort will not produce a substantial improvement.

KrF Laser

Very reliable values of the 95% integral bandwidths can be obtained using embodiments of the present invention. If the laser spectrum and the applicable atomic absorption spectrum were both Gaussian, then the convolution of the two spectra should follow:

$$(\Delta\lambda_{CON})^2=(\Delta\lambda_L)^2+(\Delta\lambda_A)^2$$

The absorption spectra for relevant iron and platinum absorption "lines" are approximately Gaussian but the narrow band ArF and the KrF laser spectra are somewhere between Gaussian and Lorentzian. The laser spectra deviates from Gaussian substantially at the wings. Therefore, the above approximation does not work very well to estimate the 95% integral. Applicants, however, have developed computer simulations which show that a quadratic relation provides an excellent estimate of the true laser 95% integral bandwidth based on the AWR convoluted spectrum measurement of the AWR 95% integral. For the KrF laser scanning over the FeNe absorption line at 248,327.1 pm of an FeNe absorption cell described above the preferred embodiment relationship is:

$$\Delta\lambda_{LASER(95\% \ INT)}=1.289 * \Delta\lambda_{AWR(95\% \ INT)}-0.989 \text{ pm}$$

Where $\Delta\lambda_{AWR(95\% \ INT)}$ is the 95% integral bandwidth in pm of the absorption dip measured by scanning the KrF laser wavelength over the iron 248,327.1 pm absorption line and measuring the dip in the intensity of the beam passing through the absorption cell.

FIG. 15 is a plot showing the results of a simulation of the convoluting the scanned KrF narrow band laser spectrum over the FeNe absorption line. The squares represent the simulation value and the smooth line is a plot of the above equation. The correlation is excellent.

ArF Laser

For the ArF laser operating in the range of 193 nm the preferred calibration line is the platinum line at 193,436.9 pm. This line in the preferred absorption cell described has a FWHM bandwidth of about 0.45 pm and a 95% integral bandwidth of about 1.5 pm. Applicants' simulations have shown excellent estimates of true laser 95% integral bandwidth using AWR measurements of the $\Delta\lambda_{AWR(95\% \ INT)}$ obtained with simulated scans across the 193,436.9 pm platinum line. The relationship is:

$$\Delta\lambda_{LASER(95\% \ INT)}-(1.274)(\Delta\lambda_{AWR(95\% \ INT)})=0.069 \text{ pm}$$

where $\Delta\lambda_{AWR(95\% \ INT)}$ is in pm's.

For ArF laser and Pt absorption line at 193,436.9 pm. Where $\Delta\lambda_{AWR(95\% \ INT)}$ is the 95% integral bandwidth in pm of the absorption dip measured by scanning the ArF laser wavelength over the 193,436.9 platinum absorption line and measuring the 95% integral of the dip in the intensity of the beam passing through the absorption cell.

Confirming Accuracy of $\Delta\lambda$ Equipment

Preferably the above estimates are used to compare with bandwidth measurements obtained with the regular bandwidth instruments discussed above. These measurements preferably would be taken simultaneously with the above described process. Applicants believe the values measured with the above technique should normally be accurate within ±20% for the FWHM bandwidths and ±10% for the 95% integral bandwidth. If bandwidth measurements using the above technique differ from measurements made with the wavemeter, the laser operator may want to check for errors in the wavemeter.

While particular embodiments of the present invention have been shown and described, it will be obvious to those skilled in the art that changes and modifications may be made without departing from this invention in its broader aspects. For example, it is a relatively easy matter to program state of the art lithography lasers to perform the above calibration and bandwidth measurements and calculation automatically upon operator direction or on some desired time interval. Therefore, the appended claims are to encompass within their scope all such changes and modifications as fall within the true spirit and scope of this invention.

What is claimed is:

1. A process for estimating the bandwidth of an output laser beam of a narrow band laser having a tunable output wavelength, using an atomic vapor cell defining at least one absorption line defining a bandwidth, said process comprising the steps of:

A. directing a portion of the output of said laser through said atomic vapor cell while scanning the output wavelength of said laser over a range of wavelengths encompassing said absorption line, B. measuring energy passing through said cell to determine a beam spectrum-vapor cell convolution absorption curve representing a convolution of the laser beam spectrum and the vapor-cell absorption spectrum, and C. using information from said curve to estimate at least one bandwidth characteristic of said output laser beam.

2. A process as in claim 1 comprising a further step of determining a full width half maximum bandwidth of said convolution absorption curve.

3. A process as in claim 1 comprising a further step of determining the 95% integral of said convolution absorption curve.

4. A process as in claim 1 wherein said laser is an ArF laser and said vapor cell comprises platinum vapor.

5. A process as in claim 1 wherein said laser is a KrF laser and said vapor cell comprises iron vapor.

6. A process as in claim 1 wherein said bandwidth estimate is used to confirm accuracy of at least one other bandwidth optical device.

7. A process as in claim 1 wherein said at least one bandwidth characteristic of said output laser beam is a full width half maximum bandwidth.

8. A process as in claim 1 wherein said at least one bandwidth characteristic of said output laser beam is a 95% integral bandwidth.

* * * * *